Figure 1:
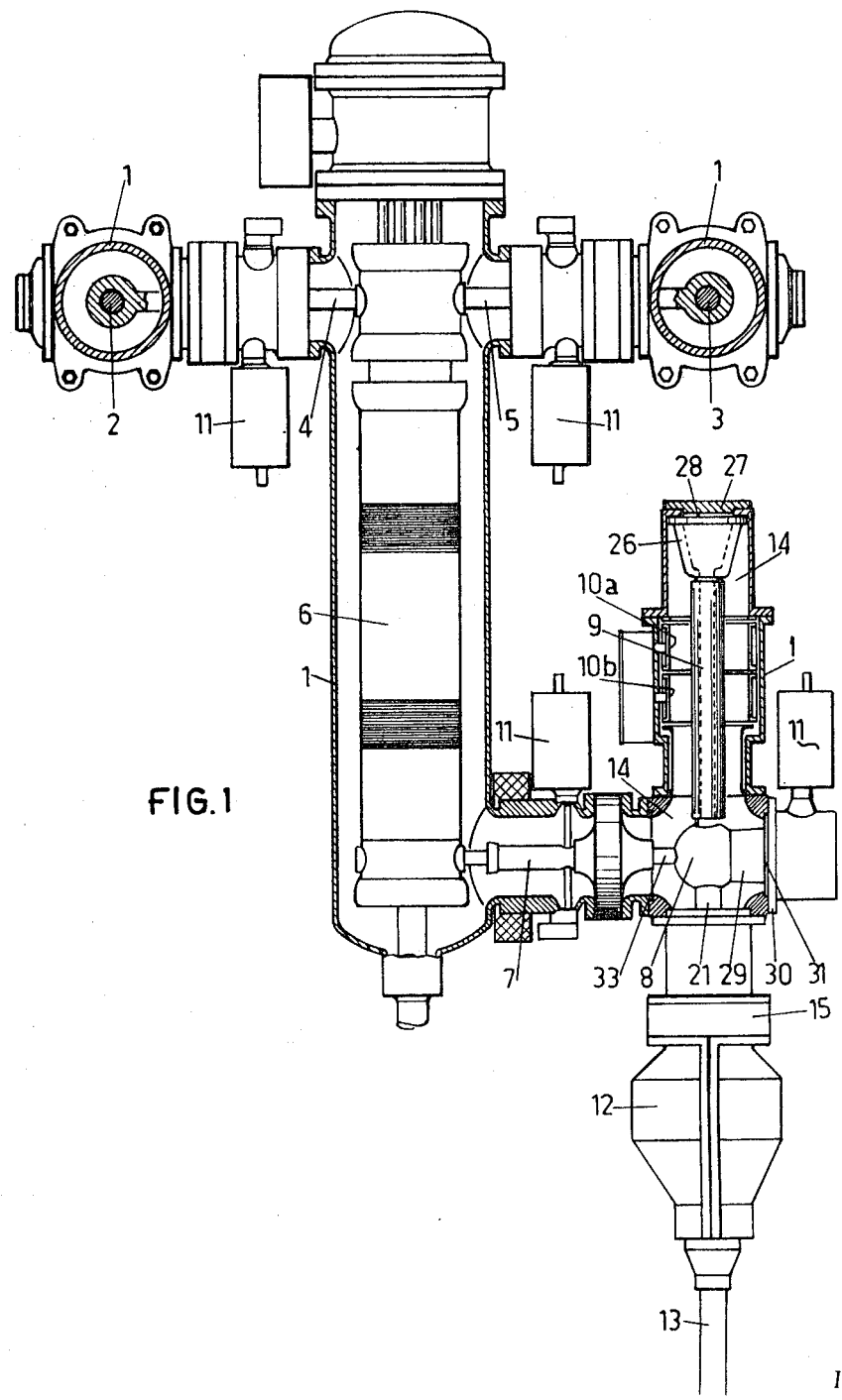

United States Patent
De Heus

[15] 3,665,257
[45] May 23, 1972

[54] METAL CLAD SWITCH-GEAR FOR HIGH VOLTAGE COMPRISING CABLE TERMINAL BOXES

[72] Inventor: Aart Arnoldus De Heus, De Meern, Netherlands

[73] Assignee: N.V. "COQ", Utrecht, Kanaalweg, Netherlands

[22] Filed: Oct. 5, 1970

[21] Appl. No.: 77,859

[30] Foreign Application Priority Data

Nov. 5, 1969 Netherlands..........................69.16682

[52] U.S. Cl. .............................317/103, 200/48 R, 200/163, 317/257
[51] Int. Cl...................H02b 1/20, H02b 3/00, H02b 13/06
[58] Field of Search ..................200/163, 148 B, 48 R, 42 R, 200/169 R, 172 A; 317/103, 257; 339/75, 84

[56] References Cited

UNITED STATES PATENTS

| | | | |
|---|---|---|---|
| 1,819,302 | 8/1931 | Rah | 200/163 X |
| 3,374,331 | 3/1968 | Brockhaus et al. | 200/163 X |
| 2,700,718 | 1/1955 | Nijland | 200/163 X |
| 2,667,573 | 1/1954 | Satinoff | 317/257 |

FOREIGN PATENTS OR APPLICATIONS

| | | | |
|---|---|---|---|
| 295,150 | 4/1965 | Netherlands | 200/163 |
| 489,740 | 2/1929 | Germany | 200/163 |
| 462,925 | 9/1968 | Switzerland | 200/148 B |

Primary Examiner—Robert K. Schaefer
Assistant Examiner—Robert A. Vanderhye
Attorney—Snyder & Butrum

[57] ABSTRACT

Metal-clad switchgear for high voltage comprising at least one cable terminal, of which the terminal members for the cable are connected by means of a conductor extending insulatedly through the wall of the envelope of the switchgear with the fixed contact of a detachable plug-and-bushing-connection accommodated in a compartment of said envelope, the movable contact of said plug-and-bushing-connection being in permanent contact with a stationary connecting element of the switchgear and mounted for operation from outside said envelope in order to enable the switchgear to be disconnected from the cable.

10 Claims, 3 Drawing Figures

INVENTOR

AART A DE HEUS

METAL CLAD SWITCH-GEAR FOR HIGH VOLTAGE COMPRISING CABLE TERMINAL BOXES

The invention relates to metal-clad switchgear for high voltage comprising a metal envelope, conducting parts insulatedly mounted therein for the conduction and distribution of current and at least one metal-clad cable terminal, which includes a metal box and terminal members insulatedly mounted therein for the connection of the end of a cable led into said box with a connecting conductor of the switchgear.

The invention has the object to make it possible to separate, without the use of the usually present cable isolator switch, the cable and the switchgear, in such a manner, that on one hand the cable can be brought under high d.c.-tension for measuring and testing purposes and on the other hand the switchgear, that means the switchgear including the cable isolator switch, can be tested with a high a.c.-tension. Generally, it is detrimental to the insulation to put parts of the switchgear under high d.c.-tension, since when d.c.-tension is used the distribution of the electric field is different from that when a.c.-tension is used. In the latter case the field distribution, that means the local load of the insulation, is also determined by capacities and local dielectric constants. On the other hand testing switchgear and the cables connected thereto with high a.c.-tension would require large power, as the cables have a great capacity. Consequently, in both cases it is advantageous to separate the switchgear and the cables.

The object aimed at is obtained in that the terminal members of the cable terminal are electrically conductively connected with a connecting conductor extending through an insulator, said connecting conductor being provided, at its end projecting into a compartment of the envelope of the switchgear, with the fixed contact of a detachable plug-and-bushing-connection, of which the movable contact is mounted for axial movement in a through boring of an electrically conductive stationary connecting element of the switchgear and is provided at its end remote from the cable terminal with one member of a pair of coupling members adapted to be coupled with one another, and in which the part of the envelope opposite the cable terminal has an opening closed by a removable cover and enabling, after removal of said cover, a rod of insulating material to be inserted therein, said rod being provided at its end with the other coupling member and being adapted to be coupled thereby with said movable contact for operating same from the outside. Such a plug-and-bushing-connection, which can be operated by hand, requires hardly any additional space, since the driving mechanism need not be accommodated in the switchgear.

Advantageously, the movable contact of the plug-and-bushing-connection may be formed as an axially movable contact rod which is provided, at its end remote from the cable terminal, with one member of a screw coupling, whereas the rod of insulating material is provided at its one end with the other member of said screw coupling.

In order to lock the movable contact in its end positions and to prevent said contact from rotating on about its axis, when the rod of insulating material is coupled therewith, e.g. screwed thereon, a simple groove may be formed in the wall of the boring of the connecting element, said groove consisting of an axially directed portion and two arc portions of circular grooves, of which each one is connected to an individual end of said axial groove portion, and the movable contact of the plug-and-bushing-connection may be provided with a transverse peg engaging said groove.

If the switching panel of the switchgear, to which the cable is connected, is provided with a capacitor for measuring and protecting purposes a construction is recommended, in which the compartment containing the connecting element contains, on the side of said element remote from the cable terminal, a cylindrical capacitor for such measuring and protecting purposes, the axis of said capacitor extending in alignment with the axis of said movable contact and the inner electrode of said capacitor being an open tube supported by a coaxial hollow supporting insulator which is attached to the part of the envelope opposite the cable terminal and in which said opening is formed, said insulator being connected with its hollow to said opening. The insulating rod to operate the movable contact can then be introduced through said cylindrical capacitor, so that said capacitor need not be taken apart, when the cable or the switchgear has to be brought under test tension.

Figure 2:
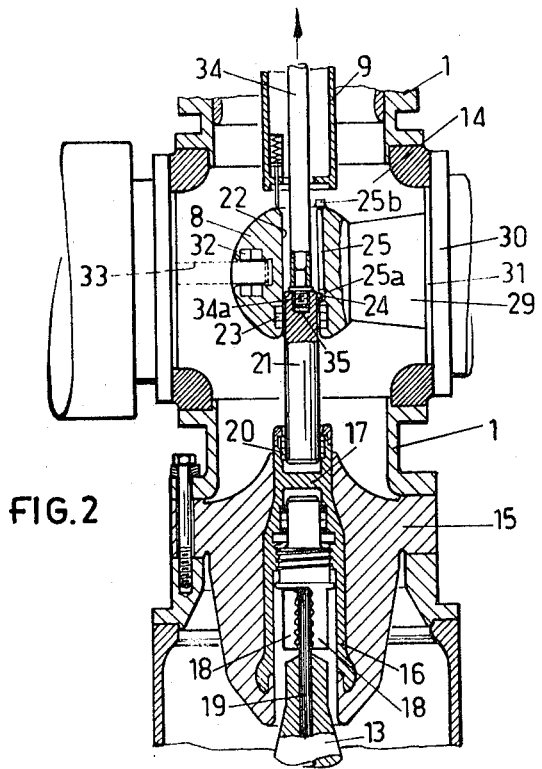
Figure 3:
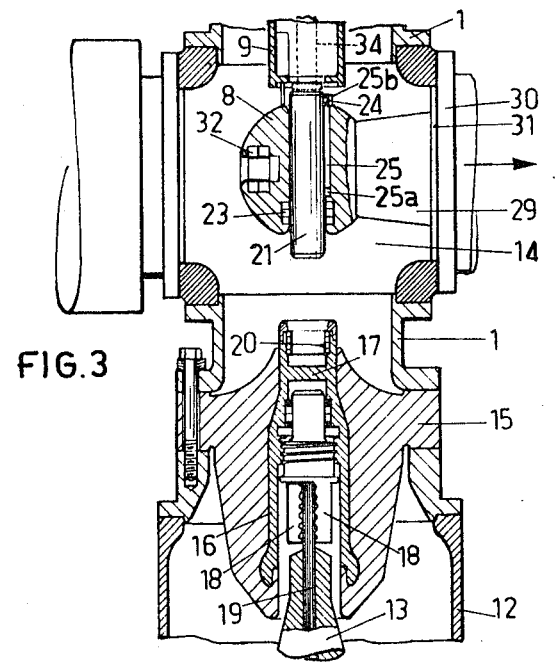

The invention will be elucidated with the aid of the drawing. Therein are:

FIG. 1 a monophase switchgear panel including a cable terminal according to the invention and shown partly in axial section partly in elevation and FIGS. 2 and 3 on a larger scale axial sectional views of a detail of the switchgear panel shown in FIG. 1 in two different conditions.

In the drawing 1 is the metal envelope of switchgear for high voltage. Insulatedly accommodated in said envelope are two busbars 2, 3 of two different busbar systems, two busbar isolator switches 4, 5, a circuit breaker 6, a cable isolator switch 7, an electrically conductive connecting element 8 and a cylindrical capacitor 9, 10a, 10b for measuring and protecting purposes, of which the inner cylinder is an open tube which is electrically conductively connected with the connecting element. Earthing switches are designated by 11. The parts referred to of the switchgear will not be described in detail, as their construction and operation are not important to the present invention. The envelope 1 may be connected with earth directly or through a protecting device (not shown). The metal box of the cable terminal for the connection of the cable 13 to the switchgear is designated by 12.

It appears from FIGS. 2 and 3 that the cable terminal box 12, which is attached to the lower side of the part of the envelope 1 confining the compartment 14, in which the connecting element 8 and the cylindrical capacitor 9, 10a, 10b, are contained, is closed by a bushing insulator 15, in which a hollow conductor 16 extends which is closed by a partition 17. Provided in the lower portion of the hollow conductor 16 are the terminal members 18 for the connection of the end of the conductor 19 of the cable 13. Mounted in the upper portion of the hollow conductor 16 is the stationary bushing contact 20 of a detachable plug-and-bushing-connection, of which the plug is formed as an axially movable contact rod 21. The contact rod 21 is mounted for axial movement in a boring 22 of the connecting element 8 and it is permanently electrically conductively connected with said element by an annular contact 23. The contact rod 21 is provided with a transverse peg 24 which engages a groove formed in the wall of the boring 22 of the connecting element 8. This groove consists of an axially directed portion 25 and two arc portions 25a, 25b of a circular groove, of which each one is connected to an individual end of said axial groove portion. If the contact rod 21 is turned with its transverse peg 24 into an arc-shaped groove 25a, 25b said rod is locked either in its contact making position (FIG. 2) or in its contact breaking position (FIG. 3) against axial movement.

The inner cylinder 9 of the capacitor is suspended from a hollow insulator 26 which is attached to the part of the envelope 1 forming the upper wall of the compartment 14. In this upper wall an opening 28 is formed which is closed by a removable cover 27. The connecting element 8 is supported by a supporting insulator 29 which is attached to a removable cover 30 closing an opening 31 formed in the envelope 1. Furthermore the connecting element 8 is provided, in a place facing the cable isolator switch 7, with one of the fixed contacts 32 of said switch, of which one of the axially movable switching rods 33 is shown in FIG. 2 in dotted lines.

If the cable 13, 19 has to be put under high d.c.-tension or the switchgear has to be put under high a.c.-tension for measuring and testing purposes, the cable isolator switch 7 is first brought into its open position. Thereupon the cover 27 is removed and a rod 34 of insulating material is introduced through the opening 28 and the inner cylinder 9 of the capacitor into the compartment 14 and screwed, by means of threaded coupling piece 34a attached to its lower end, in a matching threaded pot hole 35 formed in the upper end portion of the contact rod 21. Thereafter the contact rod 21 is turned, by means of the rod 34, with its transverse peg 24 in front of the axial groove portion 25 and thereupon it is drawn upwards, so that the connection between the cable 13, 19 and the connecting element 8 is interrupted (FIG. 3). After this manipulation the contact rod 21 is turned with its transverse peg 24 into the locking groove 25b, so that the contact 21 is locked in its contact-breaking position. Thereafter the insulating rod 34 is disconnected from the contact rod 21 and removed from the switchgear. The cable may then be brought under high d.c.-tension, for instance from its end remote from the switchgear. After the switchgear has been made entirely dead the isolator switch 7 may again be switched in and a.c.-tension for testing the switchgear may be brought through the opening 28 and the capacitor 9, 10a, 10b on the contact rod 21 and the connecting element.

What is claimed is:

1. Multiple metal-clad switchgear for the conduction and distribution of electric power of high voltage, said switchgear comprising a closed metal envelope divided into separate compartments, at least one multiphase busbar-system and multiphase switching units connected to said busbar-system and each consisting of a number of equal monophase subunits, the busbars of said system and the conducting elements of said subunits being insulatedly mounted in said metal envelope, each monophase sub-unit of at least one of said multiphase switching units comprising at least the series-connection of a circuit-breaker, a cable-isolator and a composite terminal system for the connection of a cable to said sub-unit, said cable-isolator including at least one fixed contact and one movable contact cooperating with said fixed contact, said composite terminal system comprising a conducting junction body contained in a compartment of the envelope and carrying the fixed contact of said cable-isolator, a metal cable junction box attached to said envelope and adjoining said compartment thereof, terminal members contained in said junction box for the connection of the end of the cable led into said box, a bushing insulator provided in the wall separating said compartment and said junction box, a connecting conductor extending through said bushing insulator and connected with its end projecting into the junction box with said terminal members, a second fixed contact mounted in said compartment and connected to the end of said connecting conductor projecting into said compartment, a through-boring formed in said junction body and a second movable contact mounted for axial movement in said through-boring and cooperating with said second fixed contact, said second fixed together a detachable plug-and-bushing-connection between said cable terminal members and said cable-isolator, and said monophase sub-unit comprising in addition an opening formed in the part of said envelope opposite the cable junction box and bounding said compartment, a removable cover closing said opening and a first coupling member provided at the end of said second movable contact remote from the second fixed contact and said sub-unit including a separate operating rod of insulating material and a complementary second coupling member fixed to an end of said operating rod and adapted to be coupled with said first coupling member, said operating rod being adapted to be introduced through said opening into said compartment after the removal of said cover and to be coupled by said cooperating coupling members with said second movable contact for operating same from the outside.

2. Metal-clad switchgear as claimed in claim 1, in which the movable contact of the plug-and-bushing-connection is an axially movable contact rod and the coupling members form together a screw coupling, of which one member is attached to the end of said contact rod remote from the fixed contact and the other member is attached to one end of said separate operating rod of insulating material.

3. Metal-clad switchgear as claimed in claim 1, in which a groove is formed in the wall of the boring of the connecting element, said groove consisting of an axially directed portion and two arc portions of circular grooves, of which each one is connected to an individual end of said axial groove portion, and in which a transverse peg is provided, said peg being attached to the movable contact of the plug-and-bushing-connection and engaging said groove.

4. Metal-clad switchgear as claimed in claim 1, in which a cylindrical capacitor for measuring and protecting purposes and a hollow insulator supporting said capacitor are provided in the compartment containing the connecting element and the plug-and-bushing-connection, the inner electrode of said capacitor being an open tube, the axis of which extends in alignment with the axis of the movable contact of said plug-and-bushing-connection and with the axis of the hollow of said insulator, said insulator being attached to the part of the envelope opposite the cable terminal and connected with its hollow to the opening formed in said envelope part.

5. In an electrical distribution system including a metal envelope defining a switchgear compartment and a busbar compartment, a busbar disposed in said busbar compartment, switchgear means in said switchgear compartment, busbar isolator switch means for selectively electrically connecting said busbar to said switchgear means, a metal junction box attached to said envelope, a cable having an end portion disposed within said junction box, means separating said junction box from said switchgear compartment and including electrically conductive means connected at one end to said end portion of the cable and extending into communication with said switch gear compartment, and connector means for selectively connecting said electrically conductive means to said switchgear means so as to establish electrical connection from said busbar through said switchgear to said cable, the improvement wherein said connector means comprises:

an electrically conductive junction body disposed in said switchgear compartment and having a bore therethrough aligned with that portion of said electrically conductive means which communicates with said switchgear compartment;

a contact member slidably received in said bore and being of a length to bridge between said junction body and said electrically conductive means to establish electrical connection therebetween;

cable isolator switch means for selectively connecting said switchgear means to said junction body; and means for actuating said contact member from externally of said envelope selectively to connect said electrically conductive means to said junction body whereby measurement and testing of said switchgear means together with said cable isolator switch means and exclusive of said cable may be effected under a c tension while measurement and testing of said cable may be separately effected under d c tension.

6. In an electrical distribution system as defined in claim 5 wherein said contact member is provided with a threaded recess in that end thereof remote from said electrically conductive means, and said means for actuating the contact member comprises an insulating rod having a threaded end engagable in said recess, said envelope having a removable cover portion aligned with said bore in the junction body to permit said insulating rod to be inserted into said switchgear compartment for connection with said contact member.

7. In an electrical distribution system as defined in claim 6 including means for locking said contact member both in that position in which it bridges between the junction body and the electrically conductive means and in a withdrawn position within said bore.

8. In an electrical distribution system as defined in claim 7 including a cylindrical capacitor for measuring and protecting purposes disposed in said switchgear compartment between said junction body and said removable cover portion and having its axis aligned with said bore to permit insertion of said insulating rod through said capacitor.

9. In an electrical distribution system as defined in claim 5 wherein said cable isolator switch means includes an axially movable contact engagable with said junction body and extending at right angles to the bore thereof.

10. In an electrical distribution system, a metal envelope housing a busbar and a circuit breaker in insulated relation therein; a cable terminal box attached to said envelope and housing an end portion of an insulated cable; an insulating wall separating the interior of said junction box from the interior of said envelope; an electrical connector extending through said wall and having a fixed contact socket portion within said envelope and being connected within said terminal box to said cable, a conductive junction body disposed in said envelope in spaced relation to said fixed contact portion and having a bore therethrough aligned with said socket portion; a busbar isolator switch having contacts connecting said busbar to said circuit breaker, one of which contacts is axially movable to break such connection; a cable isolator switch having contacts connecting said circuit breaker to said junction body, one of which contacts is axially movable to break such connection; a contact rod slidably received in said bore and having opposite end portions respectively received in said socket portion and said bore so as to complete the normal electrical connection between said busbar and said cable through said busbar isolator switch, said circuit breaker and said cable isolator switch to said junction body; said envelope having a removable cover portion providing access to that end of said bore remote from said fixed contact socket portion; and means for reaching into said envelope, while said cover portion is removed, and into said bore to engage said contact rod and withdraw it from engagement within said fixed contact, whereby said cable may be isolated to test its insulation by means of d.c. tension and, while the cable is so isolated from the remainder of the system, said busbar isolator switch may be opened to isolate said circuit breaker together with said cable isolator switch and said junction body from said busbar to test the insulation of such components by means of a c tension.

* * * * *